(12) United States Patent
Livshiz et al.

(10) Patent No.: US 8,566,002 B2
(45) Date of Patent: Oct. 22, 2013

(54) ENGINE CONTROL SYSTEMS AND METHODS

(75) Inventors: Michael Livshiz, Ann Arbor, MI (US); Jeffrey M. Kaiser, Highland, MI (US); Michael J. Pitsch, Ann Arbor, MI (US); Michael L. Waterman, Royal Oak, MI (US); Pahngroc Oh, Ann Arbor, MI (US)

(73) Assignee: GM Global Technology Operations LLC

( * ) Notice: Subject to any disclaimer, the term of this patent is extended or adjusted under 35 U.S.C. 154(b) by 202 days.

(21) Appl. No.: 13/166,232

(22) Filed: Jun. 22, 2011

(65) Prior Publication Data

US 2012/0265421 A1    Oct. 18, 2012

Related U.S. Application Data

(60) Provisional application No. 61/476,476, filed on Apr. 18, 2011.

(51) Int. Cl.
*G06F 19/00* (2011.01)
*F16H 61/48* (2006.01)

(52) U.S. Cl.
USPC .......................................... 701/102; 477/54

(58) Field of Classification Search
USPC ........... 123/399, 492, 493, 436, 559.1, 559.3; 701/102, 110; 73/114.13, 114.24, 73/114.25; 477/54, 110, 181
See application file for complete search history.

(56) References Cited

U.S. PATENT DOCUMENTS

| | | | | |
|---|---|---|---|---|
| 5,848,371 | A * | 12/1998 | Creger ........................... | 701/101 |
| 6,434,466 | B1 * | 8/2002 | Robichaux et al. ............. | 701/54 |
| 6,704,638 | B2 * | 3/2004 | Livshiz et al. ................. | 701/102 |
| 7,706,955 | B2 * | 4/2010 | Ichimoto et al. .............. | 701/102 |
| 8,204,639 | B2 * | 6/2012 | Jinno et al. ...................... | 701/22 |
| 2010/0087994 | A1 * | 4/2010 | Bai ................................ | 701/54 |
| 2013/0006487 | A1 * | 1/2013 | Mukkala et al. ................ | 701/53 |

* cited by examiner

*Primary Examiner* — Stephen K Cronin
*Assistant Examiner* — Elizabeth Hadley

(57) ABSTRACT

A system includes a power request module, a first desired engine speed (DRPM) determination module, a driver torque request module, and an actuation module. The power request module generates a power request for an engine of the vehicle based on an accelerator pedal position and a vehicle speed. The first DRPM determination module determines a first target DRPM based on the power request, a turbine speed of a torque converter, and a k-factor of the torque converter. The driver torque request module selectively generates a torque request for the engine based on the power request and the first target DRPM. The actuation module controls at least one engine actuator based on the torque request.

20 Claims, 8 Drawing Sheets

ENGINE CONTROL SYSTEMS AND METHODS

CROSS-REFERENCE TO RELATED APPLICATIONS

This application claims the benefit of U.S. Provisional Application No. 61/476,476, filed on Apr. 18, 2011. The disclosure of the above application is incorporated herein by reference in its entirety.

FIELD

The present disclosure relates to internal combustion engines and more particularly to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system includes a power request module, a first desired engine speed (DRPM) determination module, a driver torque request module, and an actuation module. The power request module generates a power request for an engine of the vehicle based on an accelerator pedal position and a vehicle speed. The first DRPM determination module determines a first target DRPM based on the power request, a turbine speed of a torque converter, and a k-factor of the torque converter. The driver torque request module selectively generates a torque request for the engine based on the power request and the first target DRPM. The actuation module controls at least one engine actuator based on the torque request.

A method includes: generating a power request for an engine of the vehicle based on an accelerator pedal position and a vehicle speed; determining a first target desired engine speed (DRPM) based on the power request, a turbine speed of a torque converter, and a k-factor of the torque converter; selectively generating a torque request for the engine based on the power request and the first target DRPM; and controlling at least one engine actuator based on the torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
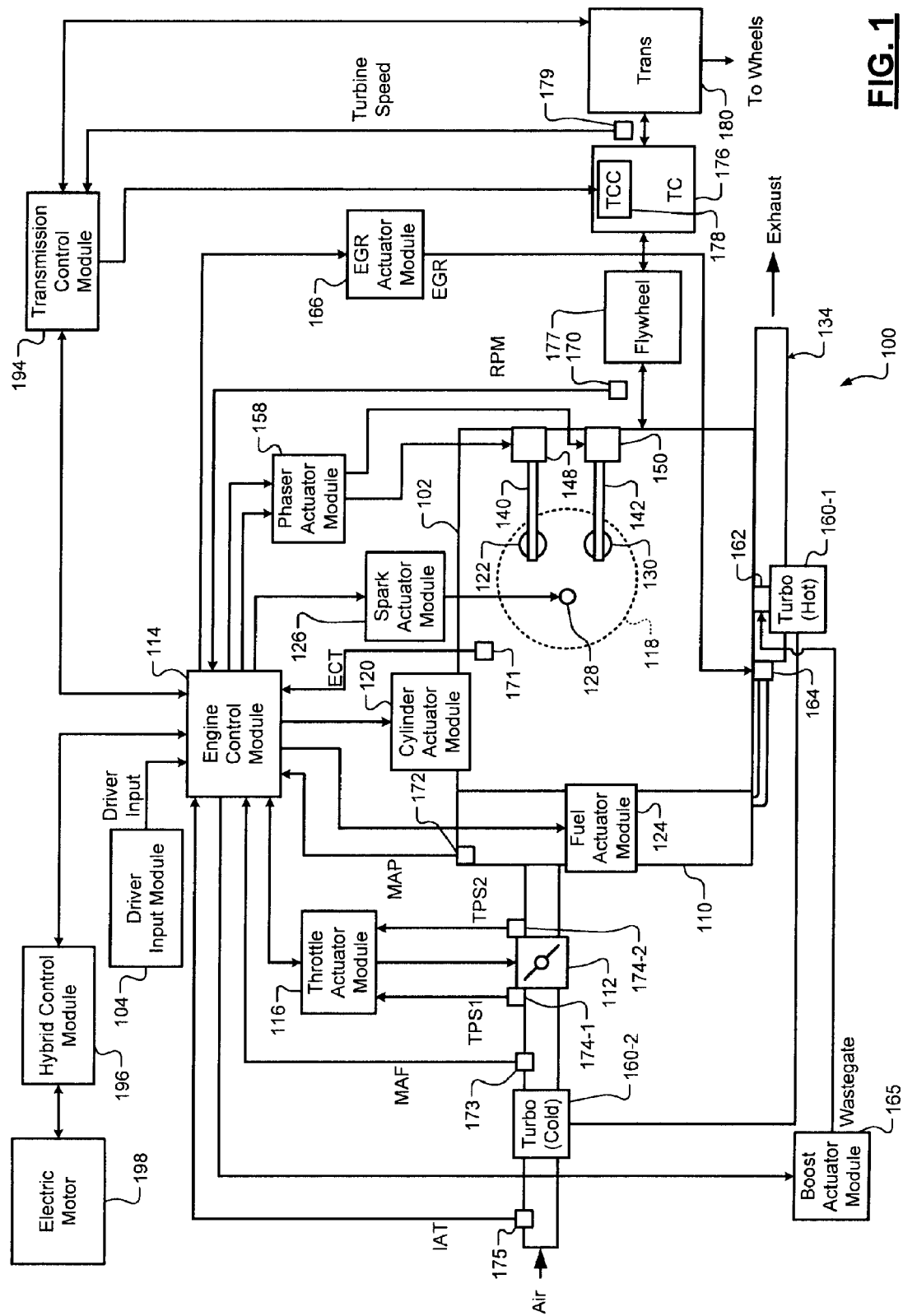
FIG. 1 is a functional block diagram of an example engine system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An engine combusts an air/fuel mixture to produce drive torque for a vehicle. An engine control module controls the torque production, for example, based on one or more driver inputs, such as an accelerator pedal position, a brake pedal position, and/or one or more other driver inputs. The engine control module generates a torque request based on the driver input(s) and controls engine actuators based the driver torque request.

The engine outputs torque to a transmission via a torque converter. The torque converter includes an impeller, a turbine, and a torque converter clutch. The impeller rotates with a crankshaft of the engine, and the impeller drives the turbine via fluid within the torque converter. The torque converter clutch can be selectively engaged and disengaged to lock and unlock rotation of the impeller with rotation of the turbine.

The engine control module of the present disclosure determines a power request (e.g., in Watts) based on the driver input(s) and vehicle speed. The engine control module determines the driver torque request based on a feed-forward power request generated based on the engine speed. Determining the driver torque request based on the feed-forward power request may improve drivability and engine performance.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

The engine system 100 may measure the speed of the crankshaft in revolutions per minute (RPM) using an RPM sensor 170. The temperature of the engine coolant may be measured using an engine coolant temperature (ECT) sensor 171. The ECT sensor 171 may be located within the engine 102 or at other locations where the coolant is circulated, such as a radiator (not shown).

The pressure within the intake manifold 110 may be measured using a manifold absolute pressure (MAP) sensor 172. In various implementations, engine vacuum, which is the difference between ambient air pressure and the pressure within the intake manifold 110, may be measured. The mass flow rate of air flowing into the intake manifold 110 may be measured using a mass air flow (MAF) sensor 173. In various implementations, the MAF sensor 173 may be located in a housing that also includes the throttle valve 112.

The throttle actuator module 116 may monitor the position of the throttle valve 112 using one or more throttle position sensors (TPS) 174. For example, first and second throttle position sensors 174-1 and 174-2 monitor the position of the throttle valve 112 and generate first and second throttle positions (TPS1 and TPS2), respectively, based on the throttle position. The ambient temperature of air being drawn into the engine 102 may be measured using an intake air temperature (IAT) sensor 175. The ECM 114 may use signals from the sensors and/or one or more other sensors to make control decisions for the engine system 100.

The engine 102 outputs torque to a torque converter 176 via a flywheel 177, such as a dual mass flywheel (DMF). The torque converter 176 includes a torque converter clutch 178, a turbine (not shown), and an impeller (not shown). The turbine drives rotation of a transmission input shaft (not shown). Rotational speed of the turbine (turbine speed) may be measured using a turbine speed sensor 179. For example only, the turbine speed may be measured based on the rotational speed of the transmission input shaft or another suitable parameter indicative of the rotational speed of the turbine of the torque converter 176. Based on a gear ratio selected within a transmission 180, torque is transferred between the transmission input shaft and a transmission output shaft (not shown). Torque may be transferred to wheels of the vehicle via the transmission output shaft.

A transmission control module 194 may control operation of the transmission 180 and the TCC 178. The ECM 114 may communicate with the transmission control module 194 for various reasons, such as to share parameters, and to coordinate engine operation with shifting gears in the transmission 180 and/or operation of the TCC 178. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 165, and the EGR actuator module 166. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
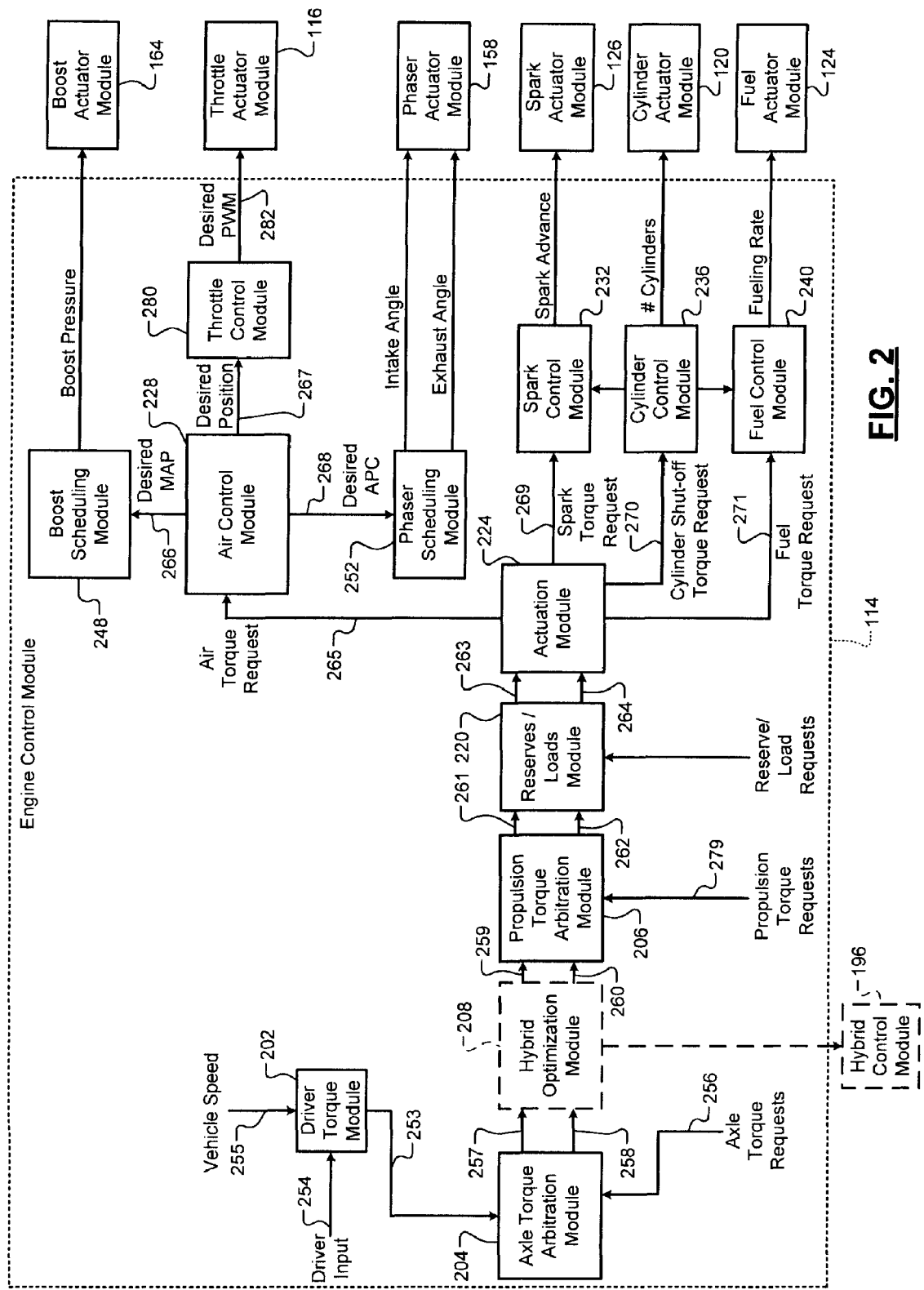
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The example implementation of the ECM 114 also includes a reserves/loads module 220, an actuation module 224, an air control module 228, a spark control module 232, a cylinder control module 236, and a fuel control module 240. The example implementation of the ECM 114 also includes a boost scheduling module 248 and a phaser scheduling module 252.

The driver torque module 202 (see also FIG. 3) may determine a driver torque request 253 based on a driver input 254 from the driver input module 104. The driver input 254 may be based on, for example, a position of an accelerator pedal and a position of a brake pedal. The driver input 254 may also be based on cruise control, which may be an adaptive cruise control system that varies vehicle speed to maintain a predetermined following distance. The driver torque module 202 may determine the driver torque request 253 further based on a vehicle speed 255. For example only, the vehicle speed 255 may be generated based on one or more measured wheel speeds, a transmission output shaft speed, and/or one or more other suitable parameters.

An axle torque arbitration module 204 arbitrates between the driver torque request 253 and other axle torque requests 256. Axle torque (torque at the wheels) may be produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 253 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the driver torque request 253. The immediate torque request 258 may be less than the predicted torque request 257, such as when the driver torque request 253 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the driver torque request 253, a torque reserve may be created when the immediate torque request 258 is less than the driver torque request 253 due to a temporary torque reduction request. Alternatively, a torque reserve may be created by increasing the predicted torque request 257 above the driver torque request 253 while maintaining the immediate torque request 258 at the driver torque request 253. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, a maximum amount of torque may be produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to a calibrated value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 165 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 165, and the EGR valve 164 may be controlled based on the predicted torque request 257 to control emissions and to minimize turbo lag. The throttle actuator module 116 may create a vacuum within the intake manifold 110 to draw exhaust gases through the EGR valve 164 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests 261 and 262 may be generated by modifying one of the received requests based on another one or more of the received torque requests.

The propulsion torque requests 279 may include torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (NC) compressor clutch. The reserve for engagement of the NC compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the NC compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other actuators.

The air control module 228 may determine desired actuator values based on the air torque request 265. For example only, the air control module 228 may determine a desired manifold absolute pressure (MAP) 266, a desired throttle position 267, and/or a desired air per cylinder (APC) 268 based on the air torque request 265. The desired MAP 266 may be used to determine a desired boost, and the desired APC 268 may be used to determine desired cam phaser positions and the desired throttle position 267. In various implementations, the air control module 228 may also determine an amount of opening of the EGR valve 164 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from a calibrated spark timing.

The cylinder shut-off torque request 270 may be used by the cylinder control module 236 to determine how many cylinders to deactivate. The cylinder control module 236 may instruct the cylinder actuator module 120 to deactivate one or more cylinders of the engine 102. In various implementations, a predefined group of cylinders (e.g., half) may be deactivated jointly.

The cylinder control module 236 may also instruct the fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder. The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The air control module 228 may output the desired throttle position 267 to a throttle control module 280. The air control module 228 may determine the desired throttle position 267 based on the air torque request 265. The throttle control module 280 generates a desired pulse width modulation (PWM) signal 282 using closed-loop control based on the desired throttle position 267. The throttle actuator module 116 actuates the throttle valve 112 based on the desired PWM signal 282. More specifically, the desired PWM signal 282 may drive (e.g., a motor of) the throttle actuator module 116 to actuate the throttle valve 112. While the desired PWM signal 282 is shown and discussed, the throttle control module 280 may control the throttle actuator module 116 using another suitable type of signal.

The air control module 228 may output the desired MAP 266 to the boost scheduling module 248. The boost scheduling module 248 uses the desired MAP 266 to control the boost actuator module 165. The boost actuator module 165 then controls one or more turbochargers (e.g., the turbocharger including the turbine 160-1 and the compressor 160-2) and/or superchargers.

The air control module 228 outputs the desired APC 268 to the phaser scheduling module 252. Based on the desired APC 268 and the RPM signal, the phaser scheduling module 252 may control positions of the intake and/or exhaust cam phasers 148 and 150 using the phaser actuator module 158.

Referring back to the spark control module 232, the calibrated spark timing may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (2)$$

This relationship may be embodied as an equation and/or as a lookup table. The air/fuel ratio (AF) may be the actual air/fuel ratio, as reported by the fuel control module 240.

When the spark advance is set to the calibrated spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The calibrated spark timing may differ slightly from MBT spark timing because of, for example, fuel quality (such as when lower octane fuel is used) and environmental factors. The engine output torque at the calibrated spark timing may therefore be less than MBT.

Figure 3:
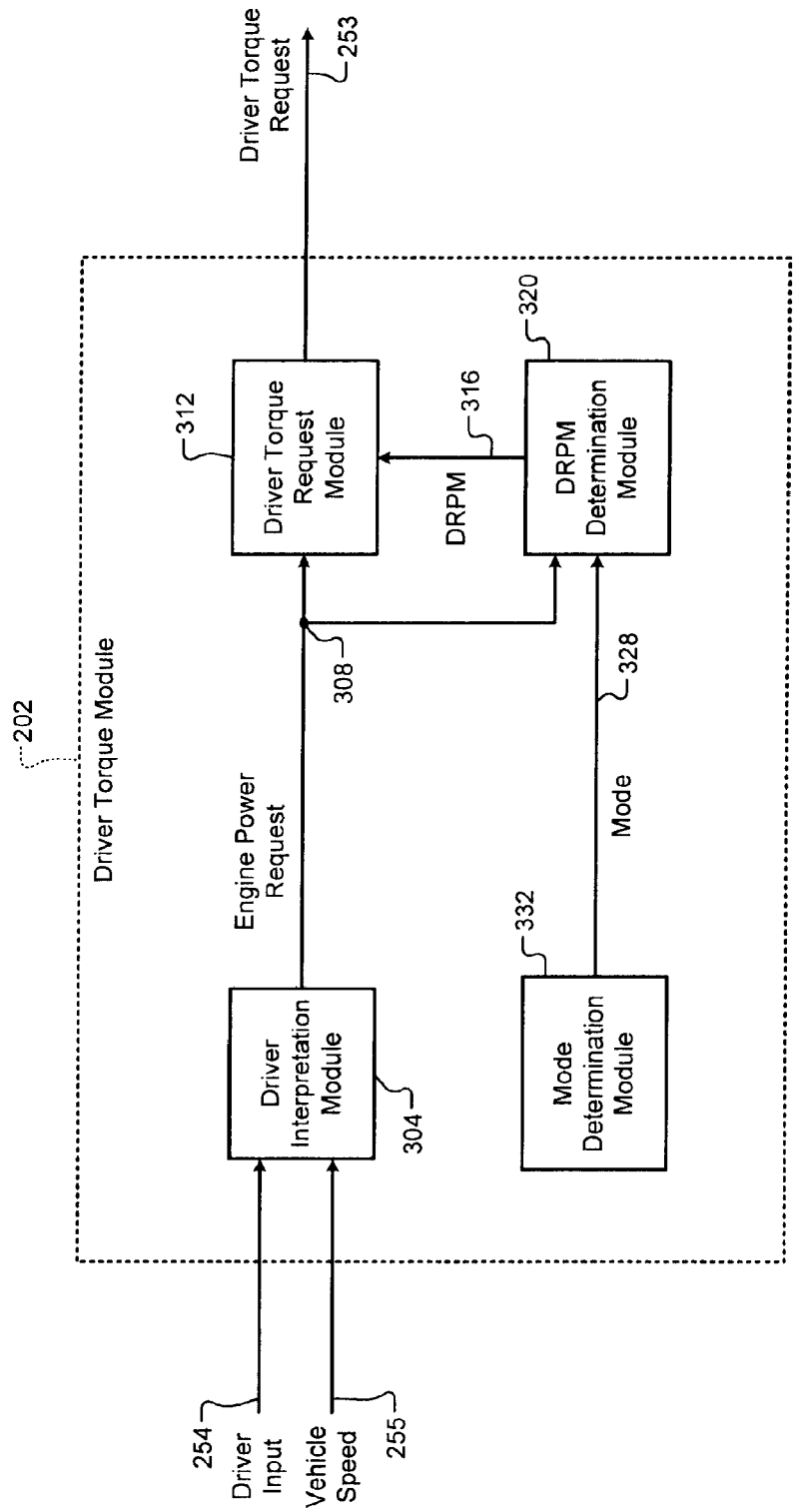
FIG. 3 is a functional block diagram of an example driver torque request module according to the present disclosure.

Referring now to FIG. 3, a functional block diagram of an example implementation of the driver torque module 202 is presented. A driver interpretation module 304 generates an engine power request 308 (e.g., Watts, horsepower, etc.) based on the driver input 254 and the vehicle speed 255. As stated above, the driver input 254 may include an accelerator pedal position and/or one or more other suitable parameters, such as a brake pedal position and cruise control inputs. The vehicle speed 255 may be generated based on, for example, one or more wheel speeds, the transmission output shaft speed, and/or one or more other parameters.

The driver interpretation module 304 may generate the engine power request 308 using a function and/or a mapping that relates the accelerator pedal position and the vehicle speed 255 to the engine power request 308. The function and/or mapping may be calibrated such that the vehicle achieves a desired acceleration for the vehicle speed 255 and the accelerator pedal position.

A driver torque request module 312 generates the driver torque request 253 based on the engine power request 308. The driver torque request module 312 generates the driver torque request 253 further based on a desired engine speed (DRPM) 316 determined for purposes of the determining the driver torque request 253.

A DRPM determination module 320 (see also FIG. 4) generates the DRPM 316. As discussed in detail below, the DRPM determination module 320 generates the DRPM 316 based on the engine power request 308, a mode 328 for determining the DRPM 316, and/or one or more other parameters. A mode determination module 332 (see also FIG. 5) determines and sets the mode 328 as discussed in detail below.

The driver torque request module 312 generates the driver torque request 253 based on converting the engine power request 308 into a torque (e.g., Nm) using the DRPM 316. The driver torque request module 312 may generate the driver torque request 253 based on the equation:

$$T = \frac{Power}{Speed}, \quad (3)$$

where a torque (T) is equal to a power (Power) divided by a rotational speed/angular velocity (Speed).

The driver torque request module 312, however, generates the driver torque request 253 using feed-forward control to decrease the period between when a change in the driver torque request 253 is made and when the engine 102 outputs torque corresponding to the driver torque request 253. For example only, the feed-forward control may include a first-order correction. For example only, the driver torque request module 312 may determine the driver torque request 253 using the equation:

$$DTR_k = \frac{FFPower_k}{DRPM_k}, \qquad (4)$$

where $DTR_k$ is the driver torque request 253 at a given time k, $DRPM_k$ is the DRPM 316 at the given time k, and $FFPower_k$ is a power determined for the given time k using the equation:

$$FFPower_k = (EPR_k - EPR_{k-1}) * a + FFPower_{k-1} + b * (EPR_{k-1} - FFPower_{k-1}), \qquad (5)$$

where $EPR_k$ is the engine power request 308 at the given time k, $EPR_{k-1}$ is the engine power request 308 at the last time k−1, $FFPower_{k-1}$ is value of FFPower at the last time k−1, and a and b are predetermined values calibrated to cause the engine 102 to achieve the engine power request 308 and the driver torque request 253 sooner than if equation (3) above was used to generate the driver torque request 253. The time k may be the time for a present control loop, and the last time k−1 may be the time for a last control loop.

Figure 4:
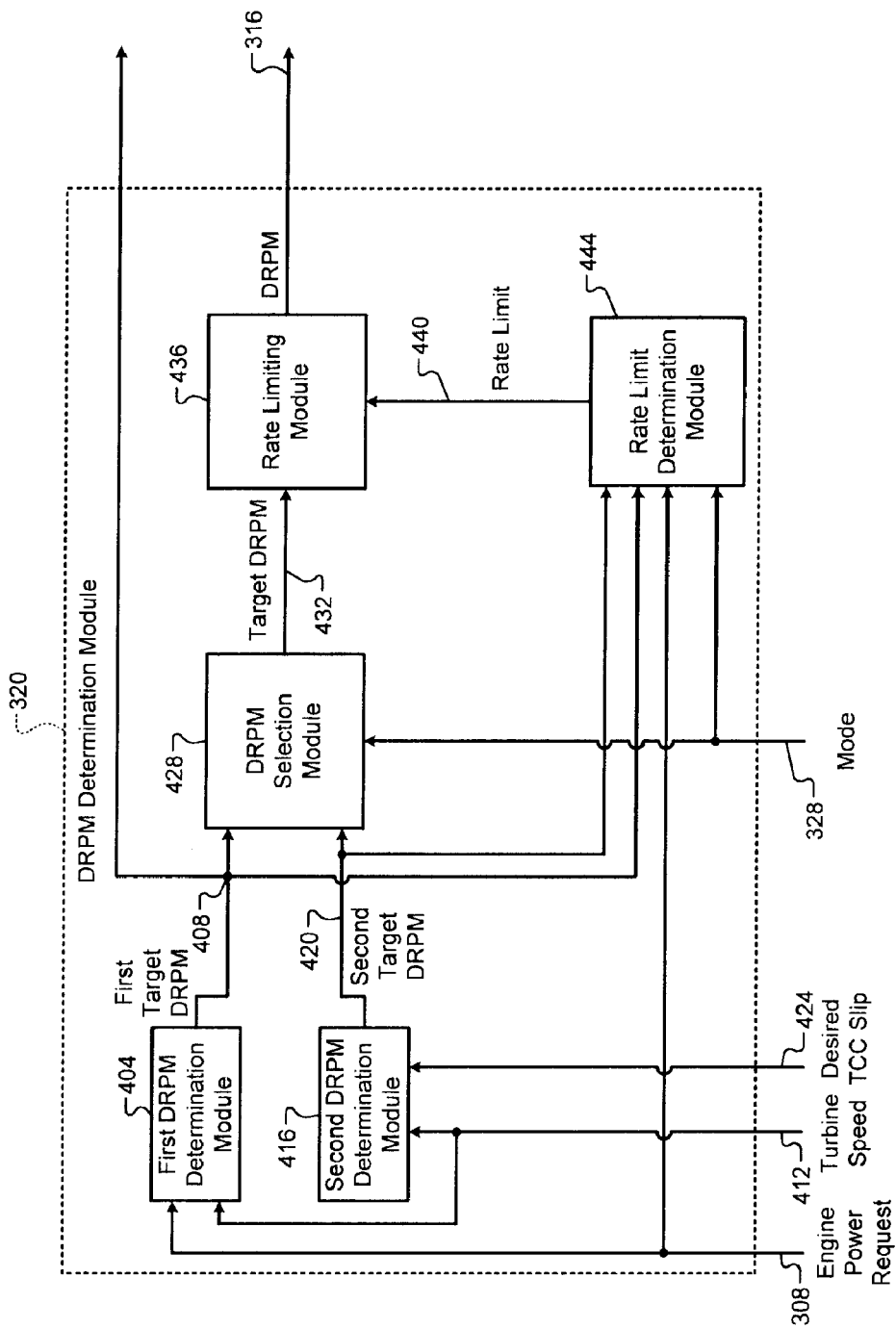
FIG. 4 is a functional block diagram of an example desired engine speed (DRPM) determination module according to the present disclosure.

Referring now to FIG. 4, a functional block diagram of an example implementation of the DRPM determination module 320 is presented. A first DRPM determination module 404 generates a first target DRPM 408. The first target DRPM 408 may correspond to a desired engine speed (i.e., DRPM) to be used in determining the driver torque request 253 (i) when the TCC 178 is in an unlocked state (a third mode) and (ii) when the TCC 178 is transitioning from a locked state to the unlocked state (a fourth mode). The mode 328 indicates one of a first mode, a second mode, the third mode, and the fourth mode. Setting of the mode 328 is discussed further below.

The first target DRPM 408 is determined based on the k-factor of the torque converter 176. Every torque converter has a k-factor. The k-factor of a torque converter is related to a stall RPM and engine torque at the stall RPM. The stall RPM may refer to the RPM where the turbine of the torque converter and the impeller of the torque converter are essentially locked via fluid within the torque converter 176. For example only, the k-factor of a torque converter may be determined as the stall RPM divided by a square root of the engine torque at the stall RPM.

When the TCC 178 is in the locked state, rotation of the transmission input shaft is locked with rotation of the crankshaft. In other words, the turbine speed is approximately equal to the RPM when the TCC 178 is locked. When the TCC 178 is in the unlocked state, the transmission input shaft and the crankshaft rotate substantially independently of each other. Rotation may be referred to as substantially independent because some fluid coupling between the turbine and the impeller may remain. Slip may refer to a difference between the RPM and the turbine speed. The TCC 178 can be controlled to achieve a desired slip value.

The first DRPM determination module 404 generates the first target DRPM 408 based on the following equation.

$$\frac{EPR}{DRPM} = \frac{DRPM^2}{k * \left(\frac{TS}{DRPM}\right)}, \qquad (6)$$

where EPR is the engine power request 308, DRPM is the DRPM 316, k is the k-factor of the torque converter 176, and TS is turbine speed 412. For example only, the turbine speed 412 may be measured using the turbine speed sensor 179. The k-factor of the torque converter 176 is a predetermined value. For example only, the first DRPM determination module 404 may determine the first target DRPM 408 using one of a function and a mapping (e.g., a lookup table) that relates the turbine speed 412 and the engine power request 308 to the first target DRPM 408. One or more parameters of the function and/or the entries of the mapping are calibrated based on the k-factor of the torque converter 176.

A second DRPM determination module 416 generates a second target DRPM 420. The second target DRPM 420 may correspond to a desired engine speed (i.e., DRPM) to be used in generating the driver torque request 253 (iii) when the TCC 178 is in the locked state (the first mode) and (iv) when the TCC 178 is transitioning from the unlocked state to the locked state (the second mode). As stated above, the mode 328 indicates one of the first, second, third, and fourth modes.

The second DRPM determination module 416 determines the second target DRPM 420 based on the turbine speed 412 and a desired TCC slip 424. The desired TCC slip 424 corresponds to a desired value of the slip of the TCC 178. For example only, the second DRPM determination module 416 may set the second target DRPM 420 equal to the sum of the turbine speed 412 and the desired TCC slip 424. The desired TCC slip 424 may be, for example, provided by the transmission control module 194. In various implementations, such as implementations where the transmission control module 194 does not provide the desired TCC slip 424, the desired TCC slip 424 may be a predetermined value (speed).

The first and second DRPM determination modules 404 and 416 output the first and second target DRPMs 408 and 420 to a DRPM selection module 428. The DRPM selection module 428 selects one of the first target DRPM 408 and the second target DRPM 420 and outputs the selected one of the first and second target DRPMs 408 and 420 as a target DRPM 432.

The DRPM selection module 428 may select the one of the first and second target DRPMs 408 and 420 to output as the target DRPM 432 based on the mode 328. For example only, the mode 328 can be set at a given time to one of the first mode, the second mode, the third mode, or the fourth mode. An example of how the mode 328 can be set is discussed further below in conjunction with the example of FIG. 5.

Broadly stated, the mode 328 may be set to the first mode when the TCC 178 is in the locked state. The mode 328 may be set to the second mode when the TCC 178 is transitioning from the unlocked state to the locked state. The mode 328 may be set to the third mode when the TCC 178 is in the unlocked state. The mode 328 may be set to the fourth mode when the TCC 178 is transitioning from the locked state to the unlocked state.

The DRPM selection module 428 may set the target DRPM 432 based on the desired TCC slip 424, a TCC status 508, a previous TCC status 512, a TCC slip 520, and/or an initial TCC slip 536. The TCC status 508, the previous TCC status 512, the TCC slip 520, and the initial TCC slip 536 are described in conjunction with the example of FIG. 5.

For example only, DRPM selection module 428 may set the target DRPM 432 to the first target DRPM 408 when the TCC status 508 indicates that the TCC 178 is locked. When the TCC status 508 indicates that the TCC 178 is locked and the previous TCC status 512 indicates that the TCC 178 is unlocked, the DRPM selection module 428 may set the target DRPM 432 may set the target DRPM 432 to the second target DRPM 420 when:

Initial Slip<First Predetermined Value, where initial slip is the initial TCC slip 536 and First Predetermined Value is a first predetermined value.

When the TCC status 508 indicates that the TCC 178 is locked and the previous TCC status 512 indicates that the TCC 178 is unlocked, the DRPM selection module 428 may set the target DRPM 432 to the second target DRPM 420 when:

Initial Slip ≥ First Predetermined Value and $$\left| \frac{\text{Initial Slip}}{\text{TCC Slip}} \right| < \text{Second Predetermined Value},$$

where Second Predetermined Value is a second predetermined value and TCC Slip is the TCC slip 520. When the TCC status 508 indicates that the TCC 178 is locked and the previous TCC status 512 indicates that the TCC 178 is unlocked, the DRPM selection module 428 may set the target DRPM 432 to the first target DRPM 408 when:

Initial Slip ≥ First Predetermined Value and $$\left| \frac{\text{Initial Slip}}{\text{TCC Slip}} \right| \geq \text{Second Predetermined Value}.$$

When both the TCC status 508 and the previous TCC status 512 indicate that the TCC 178 is locked, the DRPM selection module 428 may set the target DRPM 432 to the second target DRPM 420 when:

TCC Slip-Desired Slip<Third Predetermined Value, where Desired Slip is the desired TCC slip 424 and Third Predetermined Value is a third predetermined value. When both the TCC status 508 and the previous TCC status 512 indicate that the TCC 178 is locked, the DRPM selection module 428 may set the target DRPM 432 to the second target DRPM 420 when:

TCC Slip − Desired Slip ≥ Third Predetermined Value, and $$\left| \frac{\text{Initial Slip}}{\text{TCC Slip}} \right| < \text{Second Predetermined Value}.$$

When both the TCC status 508 and the previous TCC status 512 indicate that the TCC 178 is locked, the DRPM selection module 428 may set the target DRPM 432 to the first target DRPM 408 when:

TCC Slip − Desired Slip ≥ Third Predetermined Value, and $$\left| \frac{\text{Initial Slip}}{\text{TCC Slip}} \right| \geq \text{Second Predetermined Value}.$$

Figure 6:
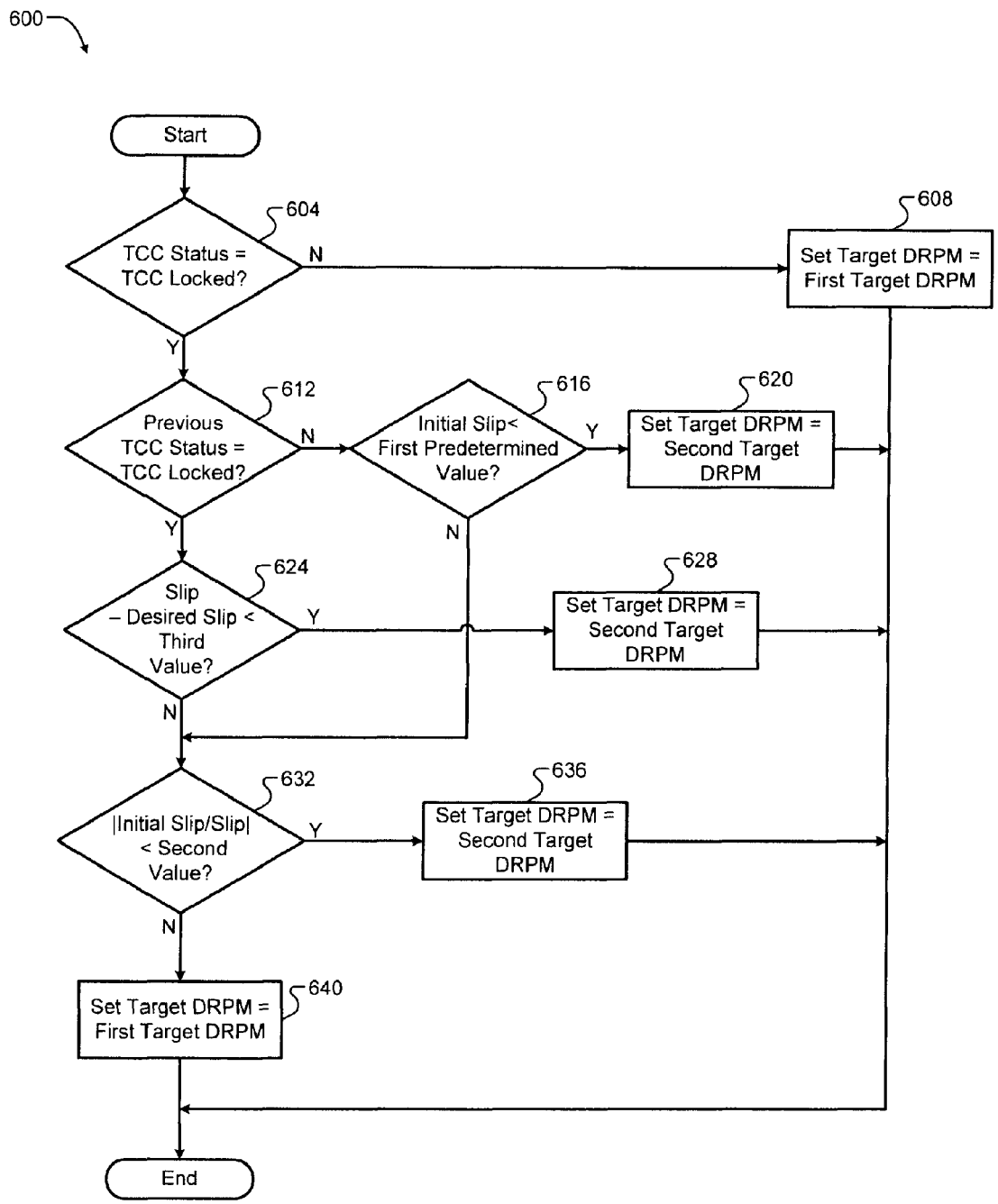
FIG. 6 is a flowchart depicting an example method of determining a target desired engine speed (DRPM) according to the present disclosure.

Setting of the target DRPM 432 is discussed in further detail in conjunction with the example of FIG. 6.

A rate limiting module 436 receives the target DRPM 432. The rate limiting module 436 outputs the DRPM 316 based on the target DRPM 432. More specifically, the rate limiting module 436 adjusts the DRPM 316 toward the target DRPM 432 at up to a rate limit 440. The rate limit 440 may correspond to a maximum amount that the rate limiting module 436 can adjust the DRPM 316 toward the target DRPM 432 per unit time (e.g., one control loop).

A rate limit determination module 444 sets the rate limit 440. The rate limit determination module 444 sets the rate limit 440 based on the mode 328. When the mode 328 indicates that the TCC 178 is in the locked state (the first mode) or that the TCC 178 is in the unlocked state (the third mode), the rate limit determination module 444 may set the rate limit 440 to a predetermined value. Alternatively, the rate limit determination module 444 may determine the rate limit 440 based on the DRPM 316 and the engine power request 308 when the mode 328 indicates that the TCC 178 is in the locked state or that the TCC 178 is in the unlocked state. For example only, the rate limit determination module 444 may determine the rate limit 440 using one of a function and a mapping that relates the DRPM 316 and the engine power request 308 to the rate limit 440.

When the mode 328 indicates that the TCC 178 is transitioning from the unlocked state to the locked state (the second mode), the rate limit determination module 444 may determine the rate limit 440 based on the first and second target DRPMs 408 and 420. More specifically, the rate limit determination module 444 may determine the rate limit 440 based on a difference between the first and second target DRPMs 408 and 420 when the mode 328 indicates that the TCC 178 is transitioning from the unlocked state to the locked state (the second mode). For example only, the rate limit determination module 444 may determine the rate limit 440 using one of a function and a mapping that relates the difference between the first and second target DRPMs 408 and 420 to the rate limit 440.

When the mode 328 indicates that the TCC 178 is transitioning from the locked state to the unlocked state (the fourth mode), the rate limit determination module 444 may determine the rate limit 440 based on the first and second target DRPMs 408 and 420. More specifically, the rate limit determination module 444 may determine the rate limit 440 based on the difference between the first and second target DRPMs 408 and 420 when the mode 328 indicates that the TCC 178 is transitioning from the locked state to the unlocked state (the fourth mode). The rate limit determination module 444 may determine the rate limit 440 further based on the engine power request 308 when the mode 328 indicates that the TCC 178 is transitioning from the locked state to the unlocked state (the fourth mode). For example only, the rate limit determination module 444 may determine the rate limit 440 using one of a function and a mapping that relates the difference between the first and second target DRPMs 408 and 420 and the engine power request 308 to the rate limit 440.

Figure 5:
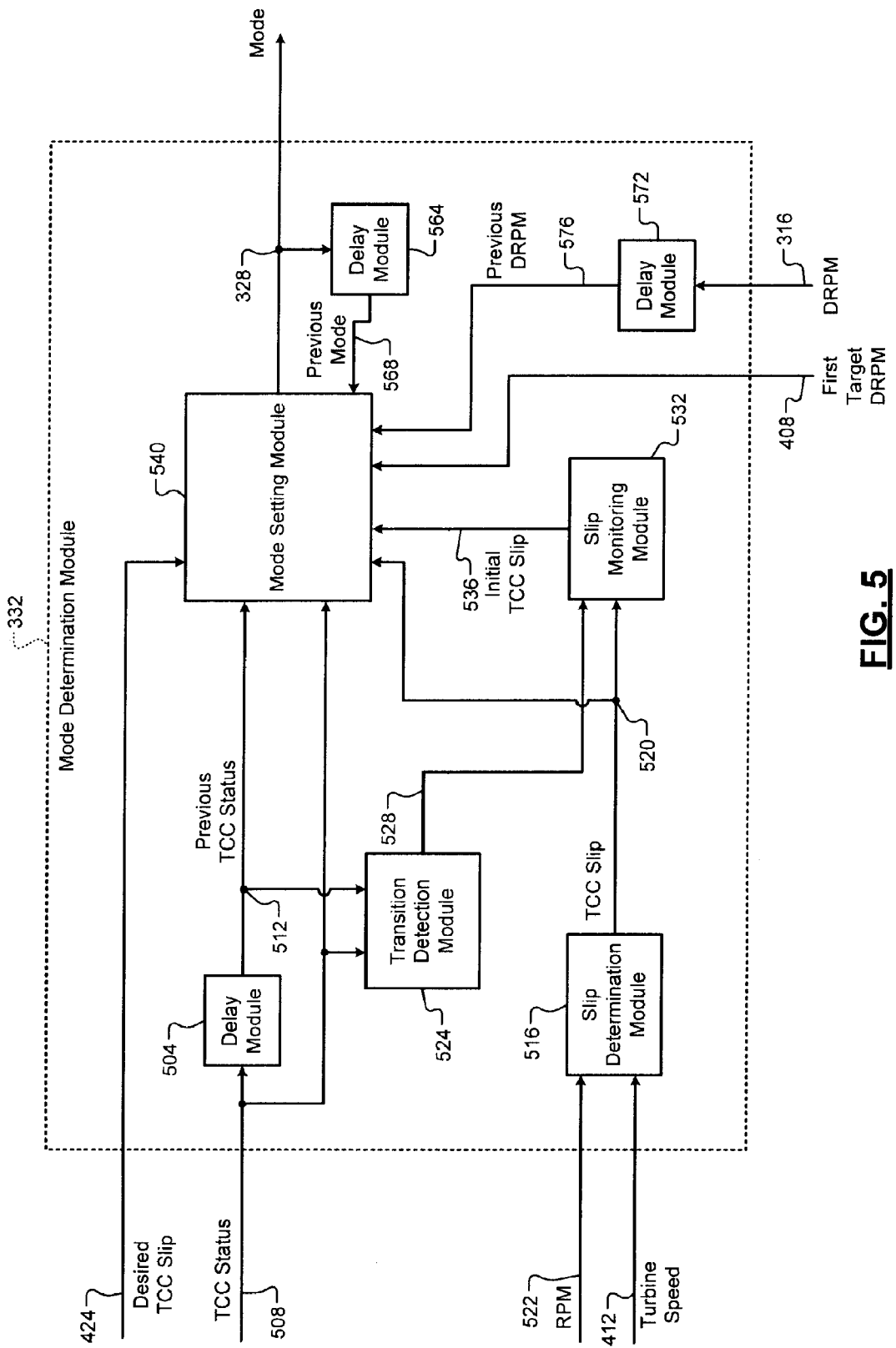
FIG. 5 is a functional block diagram of an example mode determination module according to the present disclosure.

Referring now to FIG. 5, a functional block diagram of an example implementation of the mode determination module 332 is presented. A delay module 504 receives the TCC status 508 and outputs the previous TCC status 512. The previous TCC status 512 corresponds to the TCC status 508 during a last control loop. For example only, the delay module 504 may include a one-unit, first-in-first-out (FIFO) buffer. The TCC status 508 may be generated and provided to the ECM 114, for example, by the transmission control module 194.

A slip determination module 516 determines the TCC slip 520. The slip determination module 516 may determine the TCC slip 520 based on a difference between the turbine speed 412 and a present RPM 522. One or more filters may be applied to the RPM 522 and/or the turbine speed 412 before they are input to slip determination module 516. The RPM 522 may be generated based on the measurements of the RPM sensor 170.

A transition detection module 524 detects transitions in the state of the TCC 178 based on the TCC status 508 and the previous TCC status 512. For example only, the transition detection module 524 may detect a transition in the state of the TCC 178 when the TCC status 508 and the previous TCC status 512 are different. The transition detection module 524 may generate a transition signal 528 when a transition in the state of the TCC 178 is detected.

A slip monitoring module 532 monitors the TCC slip 520. The slip monitoring module 532 sets the initial TCC slip 536 to the TCC slip 520 when the transition signal 528 is generated. In other words, the slip monitoring module 532 sets the initial TCC slip 536 to the TCC slip 520 when a transition in the state of the TCC 178 is detected. The slip monitoring module 532 may maintain the initial TCC slip 536 for a period of time, such as until the transition signal 528 is generated again.

A second delay module 564 receives the mode 328 and outputs a previous mode 568. The previous mode 568 corresponds to the mode 328 during a last control loop. For example only, the second delay module 564 may include a one-unit, FIFO buffer.

A third delay module 572 receives the DRPM 316 and outputs a previous DRPM 576. The previous DRPM 576 corresponds to the DRPM 316 during a last control loop. For example only, the third delay module 572 may include one-unit, FIFO buffer.

A mode setting module 540 sets the mode 328. The mode setting module 540 may determine how to set the mode 328 based on the first target DRPM 408, the target DRPM 432, the turbine speed 412, the TCC slip 520, the previous DRPM 576, and/or the previous mode 568. For example only, the mode setting module 540 may set the mode 328 to the first mode when the target DRPM 432 is not equal to the first target DRPM 408 and the previous mode 568 is the first mode. The mode setting module 540 may set the mode 328 to the first mode when the target DRPM 432 is not equal to the first target DRPM 408 and:

|Previous DRPM−TS−TCC Slip|<Fourth Predetermined Value, where Previous DRPM is the previous DRPM 576, TS is the turbine speed 412, TCC Slip is the TCC slip 520, and Fourth Predetermined Value is a fourth predetermined value. The mode setting module 540 may set the mode 328 to the second mode when the target DRPM 432 is not equal to the first target DRPM 408, the previous mode 568 is not the first mode, and:

|Previous DRPM-TS-TCC Slip|≥Fourth Predetermined Value.

When the target DRPM 432 is equal to the first target DRPM 408, the mode setting module 540 may set the mode 328 to the third mode when the previous mode 568 is the third mode. When the target DRPM 432 is equal to the first target DRPM 408, the mode setting module 540 may set the mode 328 to the third mode when:

|Previous DRPM-First DRPM|<Fifth Predetermined Value, where Previous DRPM is the previous DRPM 576, First DRPM is the first target DRPM 408, and Fifth Predetermined Value is a fifth predetermined value. When the target DRPM 432 is equal to the first target DRPM 408, the mode setting module 540 may set the mode 328 to the fourth mode when the previous mode 568 is not the third mode and:

|Previous DRPM-First DRPM|≥Fifth Predetermined Value.

As stated above, the rate limit determination module 444 may determine the rate limit 440 based on the mode 328. The rate limiting module 436 applies the rate limit 440 in adjusting the DRPM 316 toward the target DRPM 432.

Referring now to FIG. 6, a flowchart depicting an example method 600 of setting the target DRPM 432 is presented. At 604, control determines whether the TCC status 508 indicates that the TCC 178 is locked. If false, control may set the target DRPM 432 equal to the first target DRPM 408 at 608 and control may end. If true, control may continue with 612.

At 612, control determines whether the previous TCC status 512 indicates that the TCC 178 is locked. If false, control may transfer to 616; if true, control may continue with 624, which is discussed further below. At 616, control determines whether the initial TCC slip 536 is less than the first predetermined value. If true, control may set the target DRPM 432 equal to the second target DRPM 420 at 620, and control may end. If false, control may continue with 632, which is discussed further below.

At 624 (when the previous TCC status 512 does not indicate that the TCC 178 is locked at 612), control determines whether the TCC slip 520 minus the desired TCC slip 424 is less than the third predetermined value. If true, control may set the target DRPM 432 equal to the second target DRPM 420 at 628, and control may end. If false, control may continue with 632.

Control determines whether the absolute value of the quotient of the initial TCC slip 536 and the TCC slip 520 is less than the second predetermined value at 632. In other words, control determines whether the TCC slip 520 is decreasing at 632. If true, control sets the target DRPM 432 equal to the second target DRPM 420 at 636, and control may end. If false, control sets the target DRPM 432 equal to the first target DRPM 408 at 640, and control may end. While control is shown as ending, the method 600 may be illustrative of one control loop, and control may return to 604.

Figure 7:
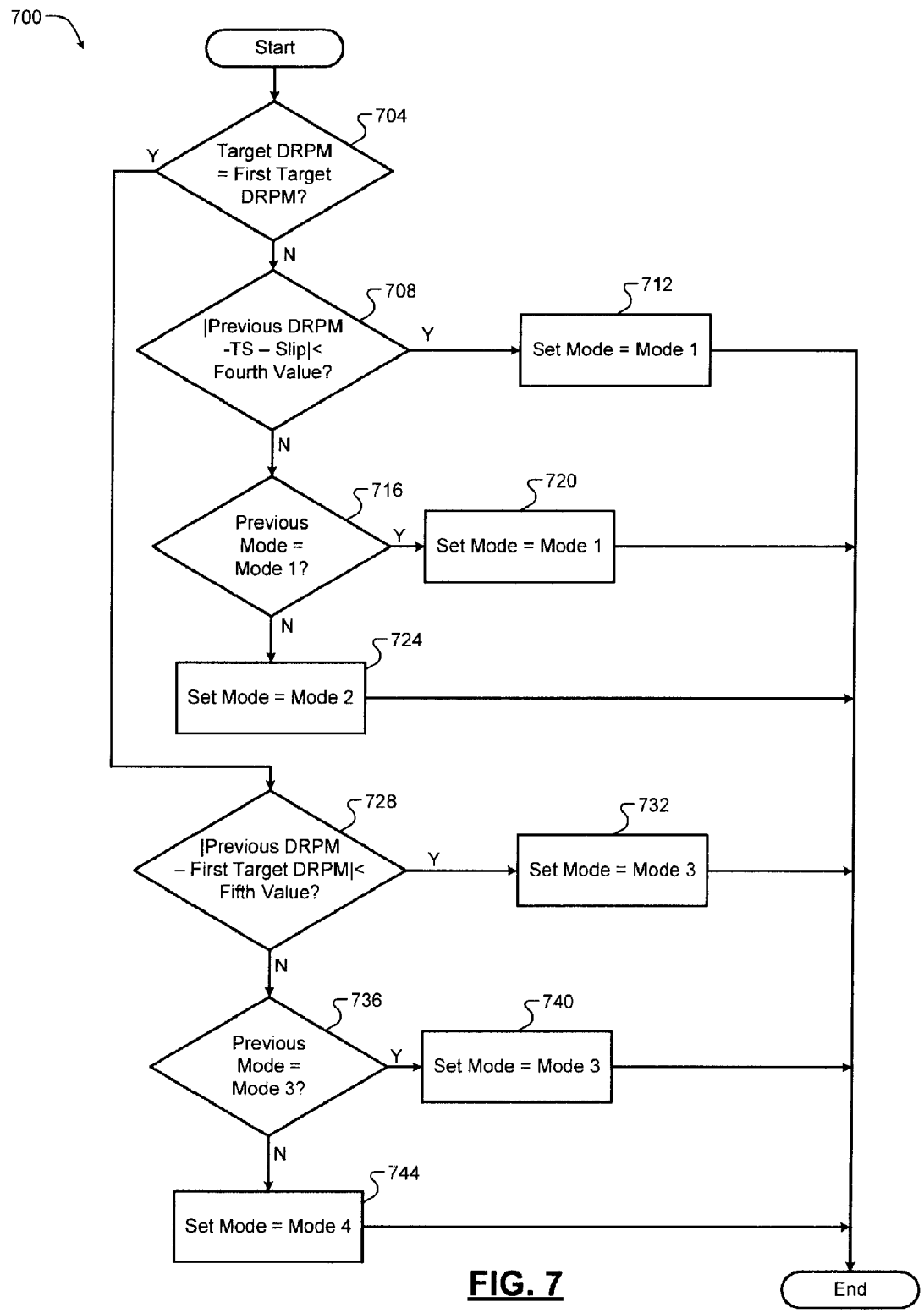
FIG. 7 is a flowchart depicting an example method of determining a mode according to the present disclosure.

Referring now to FIG. 7, a flowchart depicting an example method 700 of determining the mode 328 is presented. Control may begin with 704 where control determines whether the target DRPM 432 is equal to the first target DRPM 408. If not, control continues with 708. If true, control continues with 728, which is discussed further below.

At 708, control determines whether the absolute value of the result of the previous DRPM 576 minus the turbine speed 412 minus the TCC slip 520 is less than the fourth predetermined value. If true, control sets the mode 328 to the first mode at 712, and control may end. If false, control may continue with 716.

Control may determine whether the previous mode 568 is the first mode at 716. If true, control may set the mode 328 to first mode at 720, and control may end. If false, control may set the mode 328 to second mode at 724, and control may end.

At 728 (i.e., when the target DRPM 432 is not equal to the first target DRPM 408 at 704), control determines whether the absolute value of the result of the previous DRPM 576 minus the first target DRPM 408 is less than the fifth predetermined value. If true, control may set the mode 328 to the third mode at 732, and control may end. If false, control may continue with 736.

Control may determine whether the previous mode 568 is the third mode at 736. If true, control may set the mode 328 to the third mode at 740, and control may end. If false, control may set the mode 328 to the fourth mode at 744, and control may end. While control is shown as ending, the method 700 may be illustrative of one control loop, and control may return to 704.

Figure 8:
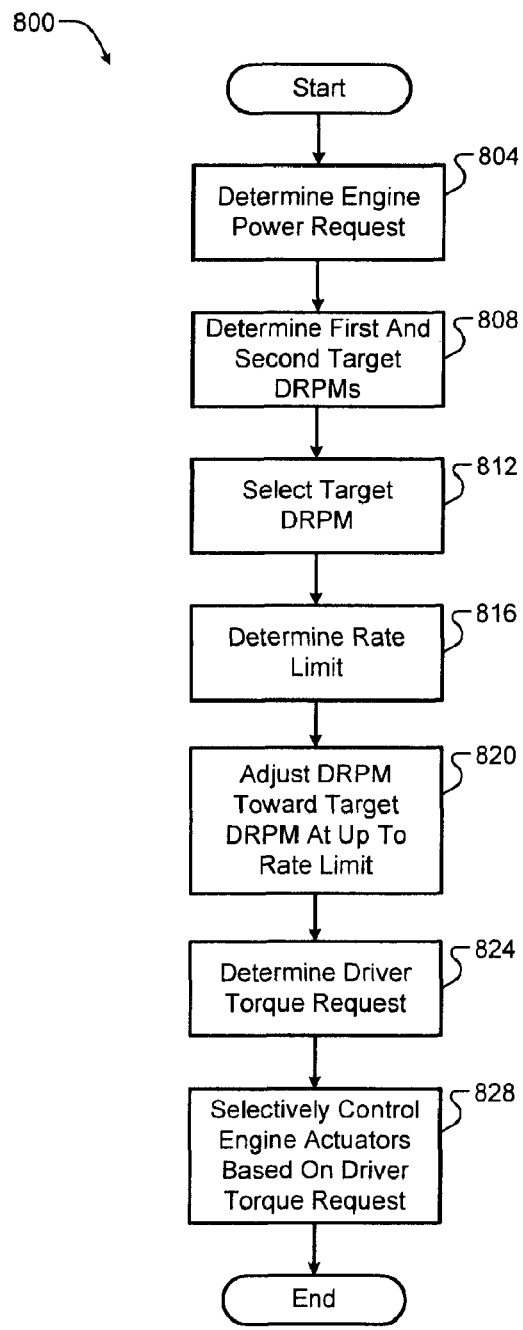
FIG. 8 is a flowchart depicting an example method of generating a driver torque request and controlling engine actuators based on the driver torque request according to the present disclosure.

Referring now to FIG. 8, a flowchart depicting an example method 800 of generating the driver torque request 253 and controlling the engine actuators based on the driver torque request 253 is presented. Control determines the engine power request 308 at 804. Control may determine the engine power request 308 based on the vehicle speed 255 and the accelerator pedal position. Control may determine the engine power request 308, for example, using one of a function and a mapping that relates the vehicle speed and the accelerator pedal position to the engine power request 308.

Control determines the first and second target DRPMs 408 and 420 at 808. Control determines the first target DRPM 408 based on the engine power request 308, the turbine speed 412, and the k-factor of the torque converter 176. Control determines the second target DRPM 420 based on the turbine speed 412 and the desired TCC slip 424.

Control determines the target DRPM 432 at 812. More specifically, control sets the target DRPM 432 equal to one of the first and second target DRPMs 408 and 420 at 812. Control may determine how to set the target DRPM 432 as described above.

At 816, control determines the rate limit 440. Control determines the rate limit 440 based on the mode 328. For example only, control may determine the rate limit 440 based on the engine power request 308 and the DRPM 316 when the mode 328 is the first mode or the third mode. Control may determine the rate limit 440 based on the difference between the first and second target DRPMs 408 and 420 when the mode 328 is the second mode. Control may determine the rate limit 440 based on the engine power request 308 and the difference between the first and second target DRPMs 408 and 420 when the mode 328 is the fourth mode.

At 820, control adjusts the DRPM 316 toward the target DRPM 432 by up to the rate limit 440. If the difference between the DRPM 316 and the target DRPM 432 is less than the rate limit 440, control may adjust the DRPM 316 to the target DRPM 432. If the difference between the DRPM 316 and the target DRPM 432 is greater than the rate limit 440, control may limit the adjustment of the DRPM 316 toward the target DRPM 432 by the rate limit 440.

At 824, control determines the driver torque request 253. Control determines the driver torque request 253 based on the engine power request 308 and the DRPM 316. For example only, control may determine the driver torque request 253 using equations (4) and (5) as described above. Control selectively controls one or more of the engine actuators based on the driver torque request 253 at 828. More specifically, control may arbitrate the driver torque request 253 with the axle torque requests 256 and the propulsion torque requests 279. Control may selectively control one or more of the engine actuators based on the result of the arbitration and further processing. Control may then end. While control is shown as ending, the method 800 may be illustrative of one control loop, and control may return to 804.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a power request module that generates a power request for an engine of the vehicle based on an accelerator pedal position and a vehicle speed;
a first desired engine speed (DRPM) determination module that determines a first target DRPM based on the power request, a turbine speed of a torque converter, and a k-factor of the torque converter;
a driver torque request module that selectively generates a torque request for the engine based on the power request and the first target DRPM; and
an actuation module that controls at least one engine actuator based on the torque request.

2. The system of claim 1 further comprising:
a second DRPM module that determines a second target DRPM based on the turbine speed;
a DRPM selection module that sets a third target DRPM equal to one of the first and second target DRPMs; and
a rate limiting module that adjusts a DRPM toward the third target DRPM by up to a maximum amount per unit time,
wherein the driver torque request module generates the torque request based on the power request and the DRPM.

3. The system of claim 2 wherein the driver torque request module determines an amount of power based on the power request, a previous value of the power request, and a previous amount of power, and
wherein the driver torque request module sets the torque request equal to the amount of power divided by the DRPM.

4. The system of claim 3 wherein the driver torque request module determines the amount of power using the equation:

$$\text{Power}_k = (\text{EPR}_k - \text{EPR}_{k-1})*a + \text{Power}_{k-1} + b*(\text{EPR}_{k-1} - \text{Power}_{k-1}),$$

where $\text{EPR}_k$ is the power request, $\text{EPR}_{k-1}$ is the previous value of the power request, $\text{Power}_{k-1}$ is the previous amount of power, and a and b are predetermined values.

5. The system of claim 2 further comprising a rate limit determination module that determines the maximum amount based on at least one of the power request, the first target DRPM, the second target DRPM, and the DRPM.

6. The system of claim 5 further comprising a mode setting module that sets a mode to one of a first mode, a second mode, a third mode, and a fourth mode,
wherein the rate limit determination module determines the maximum amount further based on the mode.

7. The system of claim 6 wherein the rate limit determination module determines the maximum amount based on the DRPM and the power request when the mode indicates that a torque converter clutch (TCC) is in a locked state.

8. The system of claim 6 wherein the rate limit determination module determines the maximum amount based on the DRPM and the power request when the mode indicates that a torque converter clutch (TCC) is in an unlocked state.

9. The system of claim 6 wherein the rate limit determination module determines the maximum amount based on a difference between the first and second target DRPMs when the mode indicates that a torque converter clutch (TCC) is transitioning to a locked state.

10. The system of claim 6 wherein the rate limit determination module determines the maximum amount based on the power request and a difference between the first and second target DRPMs when the mode indicates that a torque converter clutch (TCC) is transitioning to an unlocked state.

11. A method for a vehicle, comprising:
generating a power request for an engine of the vehicle based on an accelerator pedal position and a vehicle speed;
determining a first target desired engine speed (DRPM) based on the power request, a turbine speed of a torque converter, and a k-factor of the torque converter;
selectively generating a torque request for the engine based on the power request and the first target DRPM; and
controlling at least one engine actuator based on the torque request.

12. The method of claim 11 further comprising:
determining a second target DRPM based on the turbine speed;
setting a third target DRPM equal to one of the first and second target DRPMs;
adjusting a DRPM toward the third target DRPM by up to a maximum amount per unit time; and
generating the torque request based on the power request and the DRPM.

13. The method of claim 12 further comprising:
determining an amount of power based on the power request, a previous value of the power request, and a previous amount of power; and
setting the torque request equal to the amount of power divided by the DRPM.

14. The method of claim 13 further comprising determining the amount of power using the equation:

$$Power_k = (EPR_k - EPR_{k-1})*a + Power_{k-1} + b*(EPR_{k-1} - Power_{k-1}),$$

where $EPR_k$ is the power request, $EPR_{k-1}$ is the previous value of the power request, $Power_{k-1}$ is the previous amount of power, and a and b are predetermined values.

15. The method of claim 12 further comprising determining the maximum amount based on at least one of the power request, the first target DRPM, the second target DRPM, and the DRPM.

16. The method of claim 15 further comprising:
setting a mode to one of a first mode, a second mode, a third mode, and a fourth mode; and
determining the maximum amount further based on the mode.

17. The method of claim 16 further comprising determining the maximum amount based on the DRPM and the power request when the mode indicates that a torque converter clutch (TCC) is in a locked state.

18. The method of claim 16 further comprising determining the maximum amount based on the DRPM and the power request when the mode indicates that a torque converter clutch (TCC) is in an unlocked state.

19. The method of claim 16 further comprising determining the maximum amount based on a difference between the first and second target DRPMs when the mode indicates that a torque converter clutch (TCC) is transitioning to a locked state.

20. The method of claim 16 further comprising determining the maximum amount based on the power request and a difference between the first and second target DRPMs when the mode indicates that a torque converter clutch (TCC) is transitioning to an unlocked state.

* * * * *